United States Patent [19]

Hosoya

[11] Patent Number: 4,496,869
[45] Date of Patent: Jan. 29, 1985

[54] SMALL SHADED-POLE MOTOR

[75] Inventor: Toshiro Hosoya, Tokyo, Japan

[73] Assignee: Tobishi Industries Ltd., Tokyo, Japan

[21] Appl. No.: 447,787

[22] Filed: Dec. 8, 1982

[51] Int. Cl.³ ........................................... H02K 17/10
[52] U.S. Cl. .............................. 310/172; 310/40 MM; 310/216
[58] Field of Search ................. 310/172, 40 MM, 162, 310/163, 41, 194, 216, 184, 258, 259

[56] References Cited

U.S. PATENT DOCUMENTS

| | | | |
|---|---|---|---|
| 2,084,590 | 6/1937 | O'Leary | 310/172 |
| 2,251,674 | 8/1941 | Gillen | 310/172 |
| 3,370,189 | 2/1968 | Haydon | 310/172 |
| 3,720,864 | 3/1973 | Kolhagen | 310/172 |

FOREIGN PATENT DOCUMENTS

| | | | |
|---|---|---|---|
| 49045 | 3/1940 | Netherlands | 310/172 |
| 768415 | 2/1957 | United Kingdom | 310/172 |

Primary Examiner—R. Skudy
Attorney, Agent, or Firm—Lowe King Price & Becker

[57] ABSTRACT

A small shaded-pole motor comprises a rotor, stator core disposed in concentric relationship with the rotor, stator coils wound on the stator core and shading coils disposed in the vicinity of the stator core. The stator core consists of two generally rectangular plates each having a ring-shaped projection formed by stamping and swaging. The ring-shaped projections extend in a direction perpendicular to the plane of the plates. The height of the ring-shaped projections at their inner side is equal to about a half of the thickness of said rotor in its axial direction. The two plates are assembled together back to back so that their ring-shaped projections define a cylindrical space for the rotor. The stator coils are mounted on the portions of the back to back assembled plates other than their ring-shaped projections.

10 Claims, 13 Drawing Figures

FIG. 4a
(PRIOR ART)
FIG. 4b
(PRIOR ART)
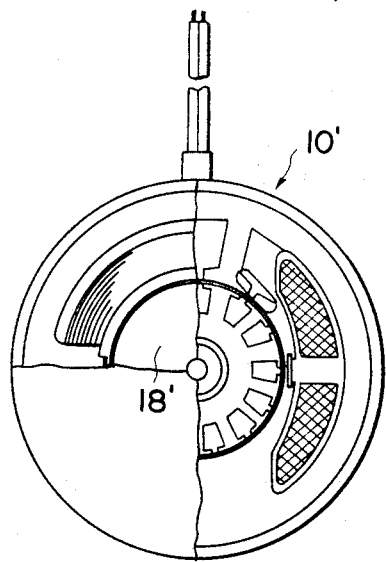
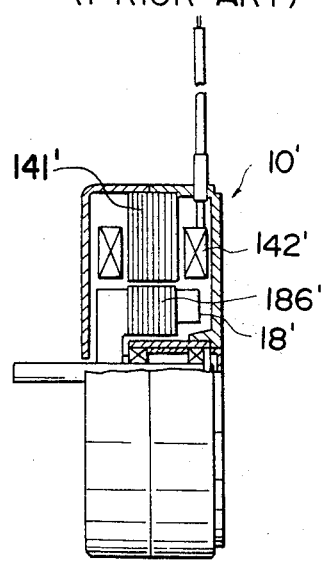
FIG. 5a
FIG. 5b
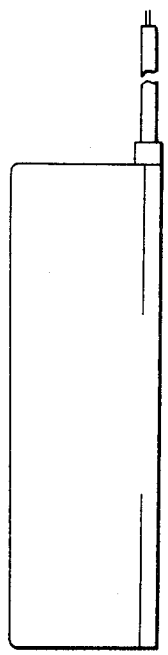
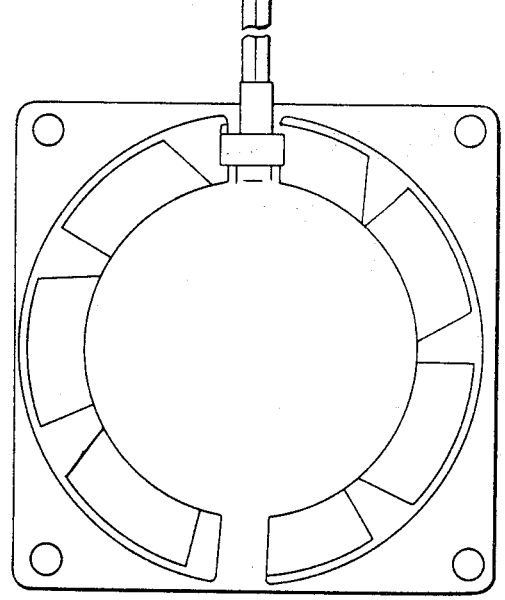

FIG. 8

| MOTOR | VOLTAGE | CURRENT | POWER | SHAFT OUTPUT | NUMBER OF REVOLUTION | TEMPERATURE RISE OF WINDINGS | NOISE |
|---|---|---|---|---|---|---|---|
| 56$^\phi$ × 15$^L$ | 100$^V$/50$^{Hz}$ | 0.095$^A$ | 8.7$^W$ | 0.11$^W$ | 2400$^{rpm}$ | 48 °C | 35 phon |
| 60$^\phi$ × 24$^L$ | 100$^V$/50$^{Hz}$ | 0.09$^A$ | 8.6$^W$ | 0.11$^W$ | 2540$^{rpm}$ | 34 °C | 36 phon |

SMALL SHADED-POLE MOTOR

BACKGROUND OF THE INVENTION

1. Field of the Invention

This invention relates to small motors, and particularly to small shaded-pole motors which are very thin in the direction of their output shafts.

2. Description of the Prior Art

Generally, with respect to machines and equipment used in the fields of electrical communications, business, instrumentation, etc., much effort is going into making a whole machine or equipment smaller, lighter, and less power consuming through the improvement of its parts with respect to materials used therefor and structures thereof. Hence, similar requirements are naturally also applied to electric motors used for such machines and equipment.

In prior art compact motors which have been used for the above applications, there are included shaded-pole motors having a shaft output of about 0.05–5 watts. A motor of this type has a stator core formed by laminating in general a number of stamped silicon steel sheets (high grade products use Fe-Co-V alloy sheets), stator coils wound on the core, and a rotor disposed within the hollow part of the stator. To maintain the amount of magnetic flux required for the gap portion in such a motor, the thickness of the stator core in the axial direction must be at least the same order as that of the rotor core. For this purpose, heretofore, silicon steel sheets or Fe-Co-V alloy sheets have been laminated to a thickness equal to that of the rotor core to form the stator core, which had the stator coils wound therearound. To provide the desired amount of flux, if the diameter of magnet wire used was 0.12 to 0.14 mm, the number of turns of the stator coil is required to be 1350-950 turns. Therefore, it has been said that, in the prior art shaded-pole motor, the thickness of the stator portion in the axial direction inevitably increased by the amount occupied by the stator coil relative to the axial thickness required for the rotor, so that the reduction of the thickness of the motor was difficult.

However, as whole machines and equipment are being made smaller, the motor itself is increasingly being required not only to be smaller, but also to have its thickness reduced.

Accordingly, it is an object of the present invention to reduce the thickness of the shaded-pole motor without degrading its performance.

SUMMARY OF THE INVENTION

According to this invention, there is provided a small shaded-pole motor comprising a rotor, a stator core disposed in concentric relationship with the rotor, stator coils wound on the stator core and shading coils disposed in the vicinity of the stator core, characterized in that the stator core consists of two generally rectangular plates each having a ring-shaped projection formed by stamping and swaging, the ring-shaped projection extending in a direction perpendicular to the plane of the plate, the height of the ring-shaped projection at its inner side being equal to about a half of the thickness of the rotor in its axial direction, the two plates being assembled together back to back so that their ring-shaped projections define a cylindrical space for the rotor, and the stator coils are mounted on the portions of the back to back assembled plates other than their ring-shaped projections.

The above structure of the present motor lads to the following advantages: since the stator coils are wound on the thinner portions of the stator core which are formed by only two plate members, the thickness of the stator coils in the direction of the axis of the motor is accordingly made smaller. On the other hand, since the assembled projections of the stator core define an air gap for the rotor over substantially the entire length of the rotor, the quantity of effective magnetic flux required for normal operation of the motor can be obtained.

The invention will now be described in further detail with regard to preferred embodiments as illustrated in the accompanying drawings.

BRIEF DESCRIPTION OF THE DRAWINGS

FIG. 4a is a view similar to FIG. 1a, showing a small shaded-pole motor well known in the prior art;

FIG. 4b is a view similar to FIG. 1b, showing the motor shown in FIG. 4a;

FIGS. 5a and 5b are side and rear views schematically illustrating the case where the motor shown in FIGS. 1 or 4 is used as a blower;

FIG. 8 is a table showing the comparison of electrical and other characteristics between the motor in accordance with the present invention and a prior art type of motor having a generally corresponding size.

DETAILED DESCRIPTION OF THE PREFERRED EMBODIMENTS

Figure 1A:
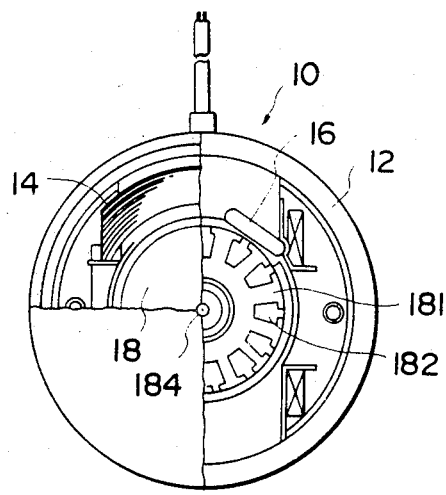
FIG. 1a is a front view of a motor in accordance with the present invention, illustrating the ends of a rotor and a stator partially broken away to show the inner structure of the motor.
Figure 1B:
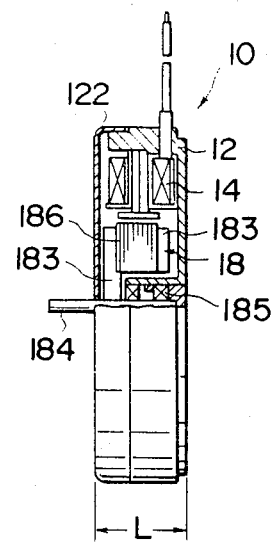
FIG. 1b is a side view of the motor shown in FIG. 1a, being partially broken away to show the inner structure thereof.

In FIGS. 1a and 1b there is shown a small very-thin shaded-pole motor 10 in accordance with the present invention. The motor 10 comprises a frame 12, a stator 14 pressed into the frame and fixed to the frame by bonding and/or caulking, shading coils 16 mounted on the stator in the vicinity of the stator core, a rotor 18 disposed in the hollow part of the stator 14 and in concentric relationship to the stator.

Figure 3:
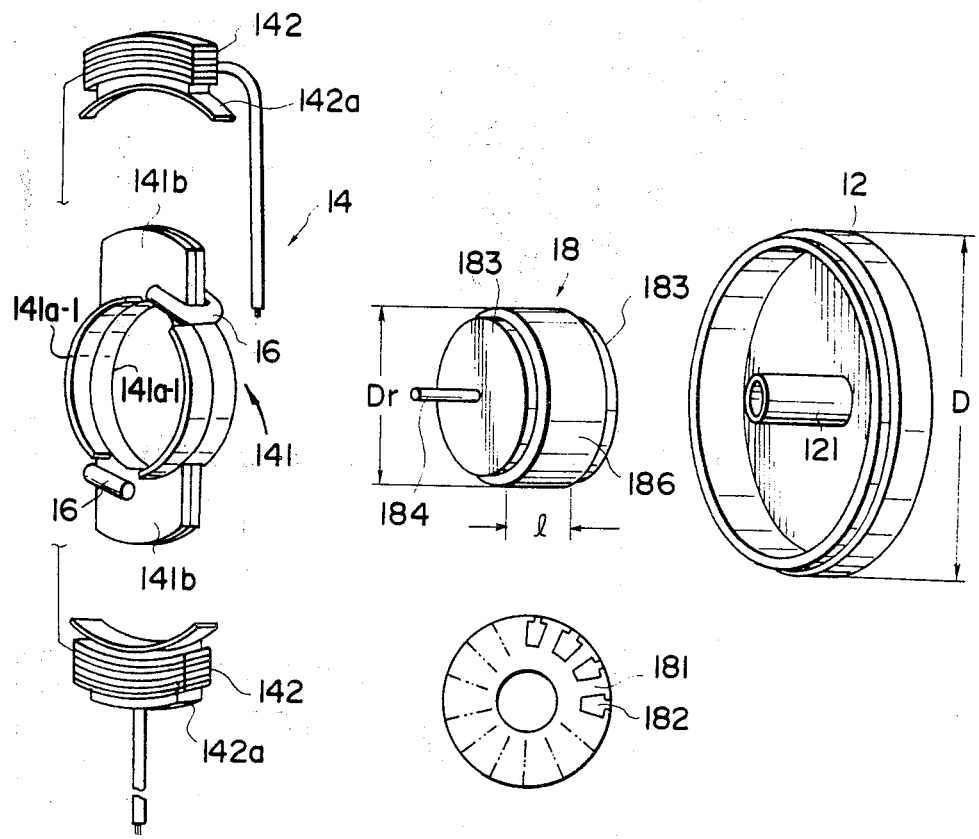
FIG. 3 is an exploded perspective view of the stator and rotor of the motor in accordance with the present invention.

The rotor 18 itself is of a conventional type, and, as shown also in FIG. 3, comprises a rotor core 181, aluminum bars 182, aluminum end rings 183, 183, and a shaft 184, which is rotatably supported through ball bearings or oilless metal 185 by a sleeve 121 provided in the frame 12.

The stator 14, as shown in FIG. 3, comprises a stator core 141 and stator coils 142, 142 wound on the stator core. In accordance with the present invention, the stator core 141 is constructed by joining back to back two elements of the type shown in FIG. 2 as 141a. Each element 141a may be a generally rectangular plate of a general rolled steel sheet (for example, JIS-G3132, 3141) or a silicon steel sheet or a Fe-Co-V alloy sheet, classified as the highest grade material, if allowed in cost, with a ring-shaped projecting portion 141a-1 extending in a direction of the thickness of the sheet formed by stamping and swaging. It is advantageous to form notch portions 141a-2, 141a-2 in the ring-shaped projecting portion 141a-1 and mount the shading coils 16 on these notch portions, thereby causing shading coil's flux to act effectively. The projecting height (including the thickness of the sheet) "h" of the ring-shaped projecting portion 141a-1 is made equal or nearly equal to a half of the thickness "1" of the core portion 186 of the rotor 18 (see FIG. 3).

As described above, the stator core 141 (FIG. 3) is formed by joining two elements 141a back to back, and stator coils 142 are wound on the flat surface portions 141b, 141b. While in FIG. 3 a bobbin 142a (only one half of a pair of bobbins is shown) having a coil wound thereon and finished by varnish treatment, is mounted and fixed on each of the flat surface portions 141b of the stator core 141, the coil may be wound directly on the flat surface portions 141b after coating of resin (for example, epoxy resin) thereon.

That is, in the motor in accordance with the present invention, the thickness of the stator core 141 is equal to the thickness for two elements and the stator coil 142 is wound on the flat surface portion formed by joining two elements back to back. Therefore, a corresponding reduction of the thickness of the whole stator becomes possible, and the reduction of the thickness of the motor itself is achieved.

In contrast to such a motor in accordance with the present invention, for a prior art motor 10', shown in FIGS. 4a, 4b, silicon steel sheets or Fe-Co-V alloy sheets are laminated to the thickness corresponding to the thickness of the core portion 186' of the rotor 18' to form the stator core 141', on which the stator coil 142' is wound directly or through a bobbin (not shown), so that the axial thickness of the stator becomes significantly larger than the axial thickness of the rotor's core portion 186', and therefore the reduction of the thickness of the motor itself becomes impossible.

The manufacture of the motor in accordance with the present invention and characteristics of the manufactured motor will now be described further.

Figure 2:
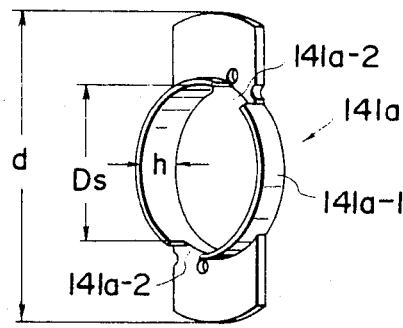
FIG. 2 is a perspective view showing an element constituting a stator core used in the motor in accordance with the present invention.

A rotor 18 having an axial thickness ("1" in FIG. 3) of 8 mm and an outer diameter ("Dr" in FIG. 3) of 26.95 mm in its core portion was manufactured by a normal method. An element 141a as shown in FIG. 2 was manufactured by stamping out with a power press from a general rolled steel sheet having a thickness of 1.6 mm. This element had a ring-shaped projecting portion 141a-1 having an inner diameter ("Ds" in FIG. 2) of 27.35 mm and an inside height ("h" in FIG. 2) of 4 mm, and the total length of the element 141a ("d" in FIG. 2) was 50 mm. A stator core 141 was made by joining two elements 141a back to back. A stator was constructed by mounting coils, which were formed by winding 1550 turns of a 0.1 mm diameter wire on each of separately formed bobbins 142a, 142a, shaped and finished by varnish treatment, on flat surface portions 141b, 141b of the stator core 141 on which portion shading coils 16 had been mounted in the vicinity of the stator core.

A motor 10 is assembled by mounting the rotor 18 on the sleeve 121 of the frame 12 (outer diameter D in FIG. 3 in 56 mm), pressing the stator into the frame 12, and attaching a cover plate 122 (FIG. 1b). The motor had an axial thickness ("L" in FIG. 1b) of 15 mm. As is apparent from FIG. 3, in a motor constructed in accordance with the invention the flat portions 141b extend beyond the ring-shaped projecting portions 141a-1 thereof.

Figure 6A:
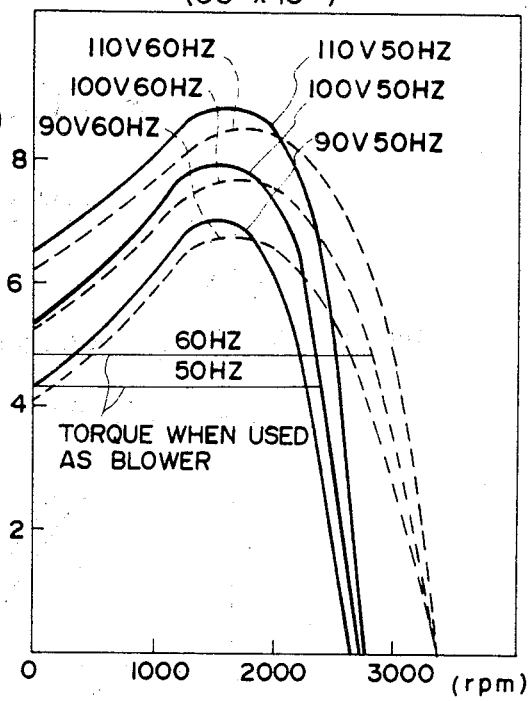
FIGS. 6a and 6b are graphs showing torque-speed characteristics of the motor in accordance with the present invention and a prior art type of motor having a generally corresponding size.
Figure 6B:
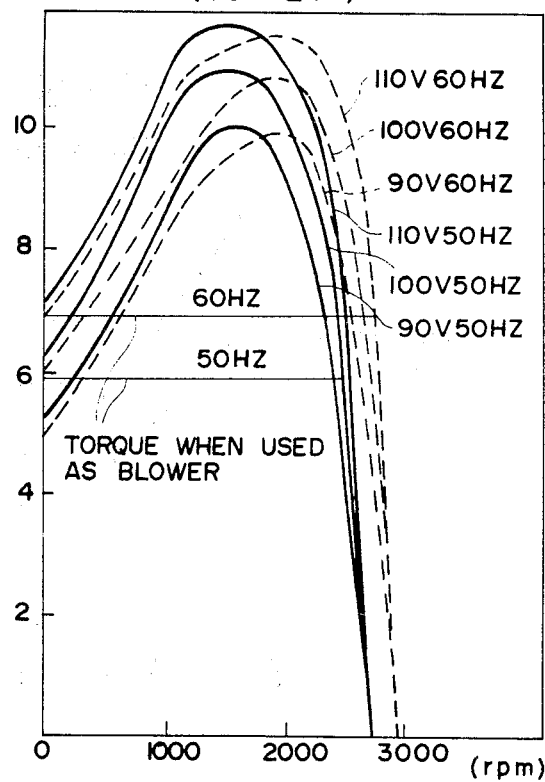

In spite of the use of the general rolled steel sheet as a material for the stator and rotor cores, the torque-speed characteristics and the electrical characteristics of this motor ($56^\phi \times 15^L$) were generally similar to those of the motor ($60^\phi \times 24^L$) of the prior art constructed in a manner as shown in FIG. 4 using the silicon steel sheet as a core material, as shown in FIGS. 6 and 8, and were satisfactory.

The flux density of each of magnetic paths of the motor in accordance with the present invention was as follows:

| Mean air gap flux density | $B_g =$ 3000 |
|---|---|
| Stator pole portion | $B_{st} \approx$ 14500 |
| Stator ring projection portion | $B_{sg} \approx$ 4700 |
| Frame yoke portion | $B_{fg} \approx$ 11000 |
| Rotor yoke portion | $B_{ry} \approx$ 15000 |
| Rotor tooth portion | $B_{rt} \approx$ 16700 |

Figure 7A:
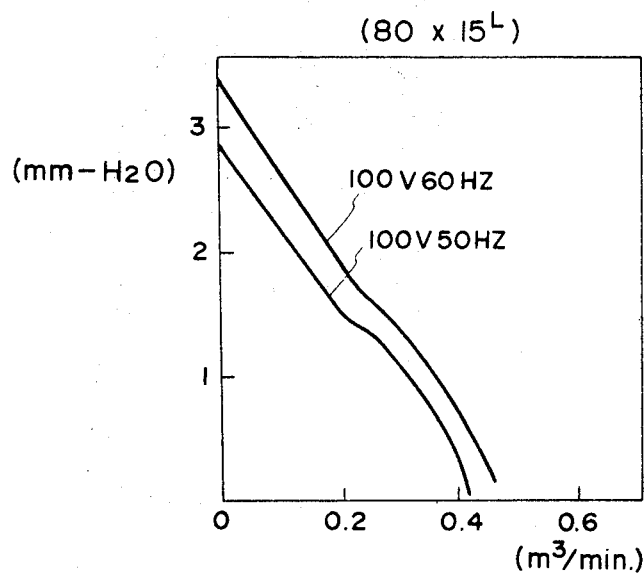
FIGS. 7a and 7b are graphs showing static pressure-air volume characteristics in cases where the motor in accordance with the present invention and a prior art type of motor having a generally corresponding size are applied to the blower in such a manner as shown in FIG. 5.
Figure 7B:
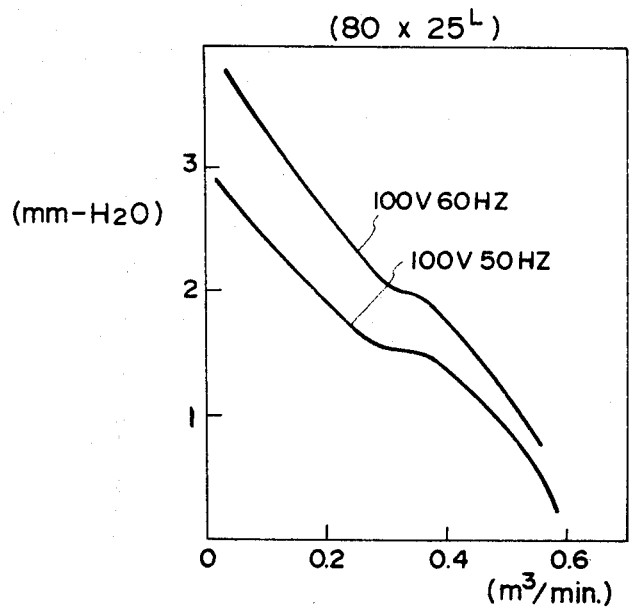

Additionally, static pressure-air volume characteristics for the above motor formed in accordance with the present invention when used as a blower are shown in FIG. 5 (in this case the outer diameter of the motor is 80 mm). These characteristics are generally comparable to those in the case of a blower ($80 \times 25^L$) constructed in a similar manner using the motor of the prior type shown in FIG. 4 (see FIG. 7).

In the above described motor in accordance with the present invention, the element 141a was made of general rolled steel and hence used a sheet material of 1.6 mm, so that the substantial thickness of the stator core portion became that for two sheets, that is, 3.2 mm. However, if the silicon steel sheet or Fe-Co-V alloy sheet, if allowed, is employed as a material for constituting the element, desired functions are achievable even if the thickness of the sheet is further reduced, and therefore the substantial thickness of the stator core portion may further be reduced.

I claim:

1. A small-shaded-pole motor comprising a rotor, a stator core disposed in concentric relationship with the rotor, stator coils wound on the stator core and shading coils disposed in the vicinity of the stator core, characterized in that said stator core comprises two generally rectangular plates each having a ring-shaped stamped and swaged projection and a flat plate portion, said ring-shaped projection extending in a direction perpendicular to the plane of the plate, the height of said ring-shaped projection at its inner side being equal to about a half of the thickness of said rotor in its axial direction, said two plates being assembled together back to back so that their ring-shaped projections define a cylindrical space for said rotor and so that said flat plate portions are in planar contact with each other, and said stator coils are mounted on said flat plate portions of said back to back assembled plates.

2. A small shaded-pole motor as claimed in claim 1 wherein said ring-shaped projections are provided with notches, and said shading coils are disposed in said notches.

3. A small shaded-pole motor as claimed in claim 1 wherein said stator coils are mounted directly on said flat plate portions of said back to back assembled plates.

4. A small shaded-pole motor as claimed in claim 1 wherein said stator coils are mounted on bobbins, said bobbins mounted on said flat plate portion of said back to back assembled plates.

5. A small shaded-pole motor as claimed in claim 1 wherein said flat plate portions extend beyond said ring-shaped projections.

6. In a small shaded-pole motor comprising a rotor, a stator core disposed concentrically with the rotor, stator coils wound on the stator core and shading coils adjacent the stator core, the improvement wherein:
said stator core includes a pair of structures, each having a substantially flat first portion and a second portion forming a cylindrical element for receiving the rotor, said cylindrical element projecting perpendicularly to said substantially flat first portion, the second portion projecting to one side of said substantially flat first portion for each of said structures, said structures mounted in an arrangement having said substantially flat first portions thereof in planar contact with one another,
whereby a combined cylindrical element having a length substantially greater than the thickness of a combined substantially flat portion supporting the combined cylindrical element projects on two sides of said combined substantially flat portion for receiving the rotor therein.

7. The improvement of claim 6 wherein said shading coils are mounted on said substantially flat first portion.

8. The improvement of claim 6 wherein said first coils are mounted on said substantially flat first portions of said structures forming said stator core.

9. The improvement of claim 6 wherein each of said structures forming said stator core comprises a planar portion having a stamped and swaged projection to one side thereof.

10. The improvement of claim 6 wherein said substantially flat first portion includes an indentation for receiving said shading coils.

* * * * *